Oct. 14, 1941.  G. J. C. FAILING ET AL  2,259,432
CYLINDER AND PISTON STRUCTURE FOR PRESSURE DEVICES
Filed May 25, 1938  2 Sheets-Sheet 2
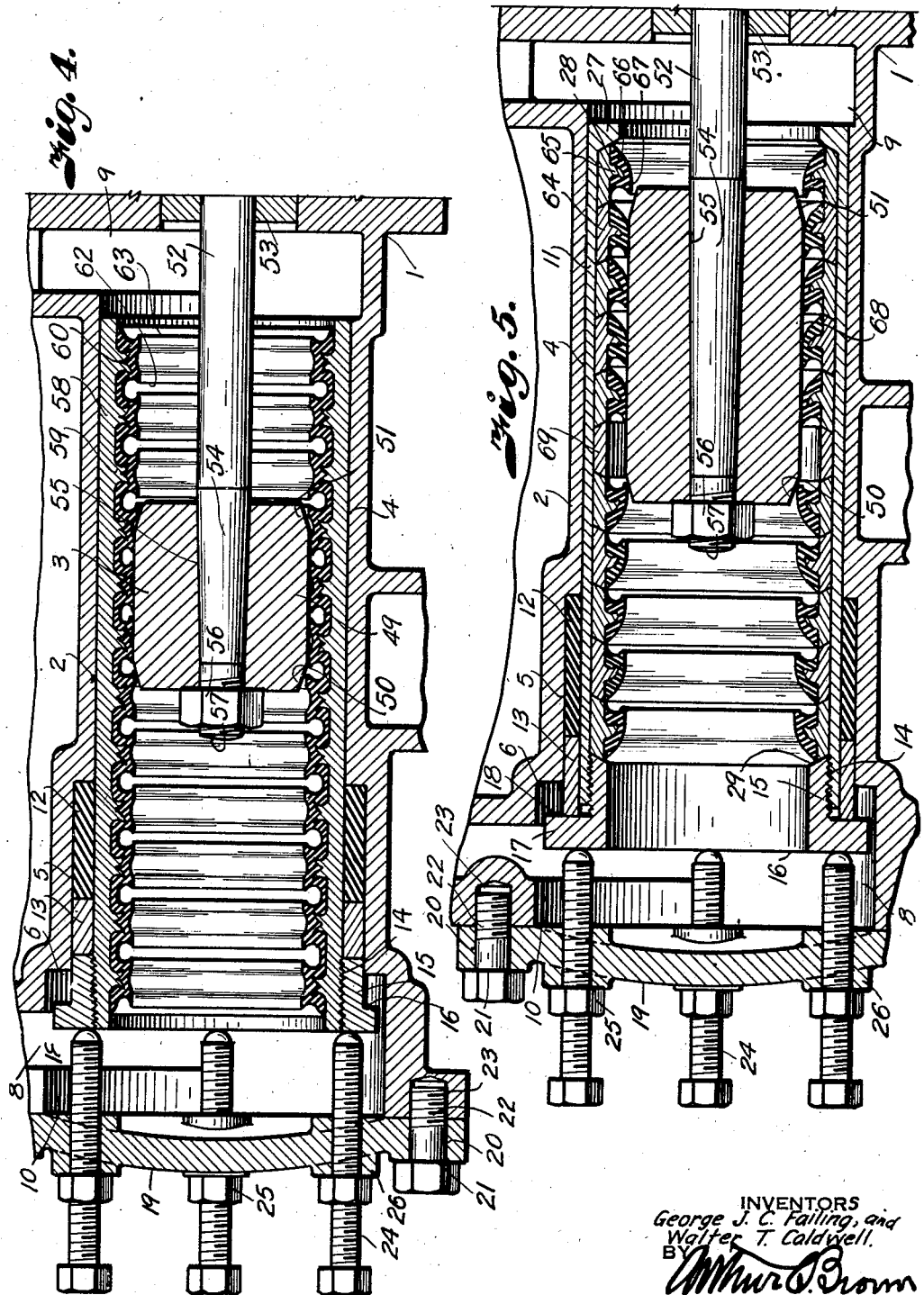
INVENTORS
George J. C. Failing, and
Walter T. Caldwell.
BY
ATTORNEY Patented Oct. 14, 1941

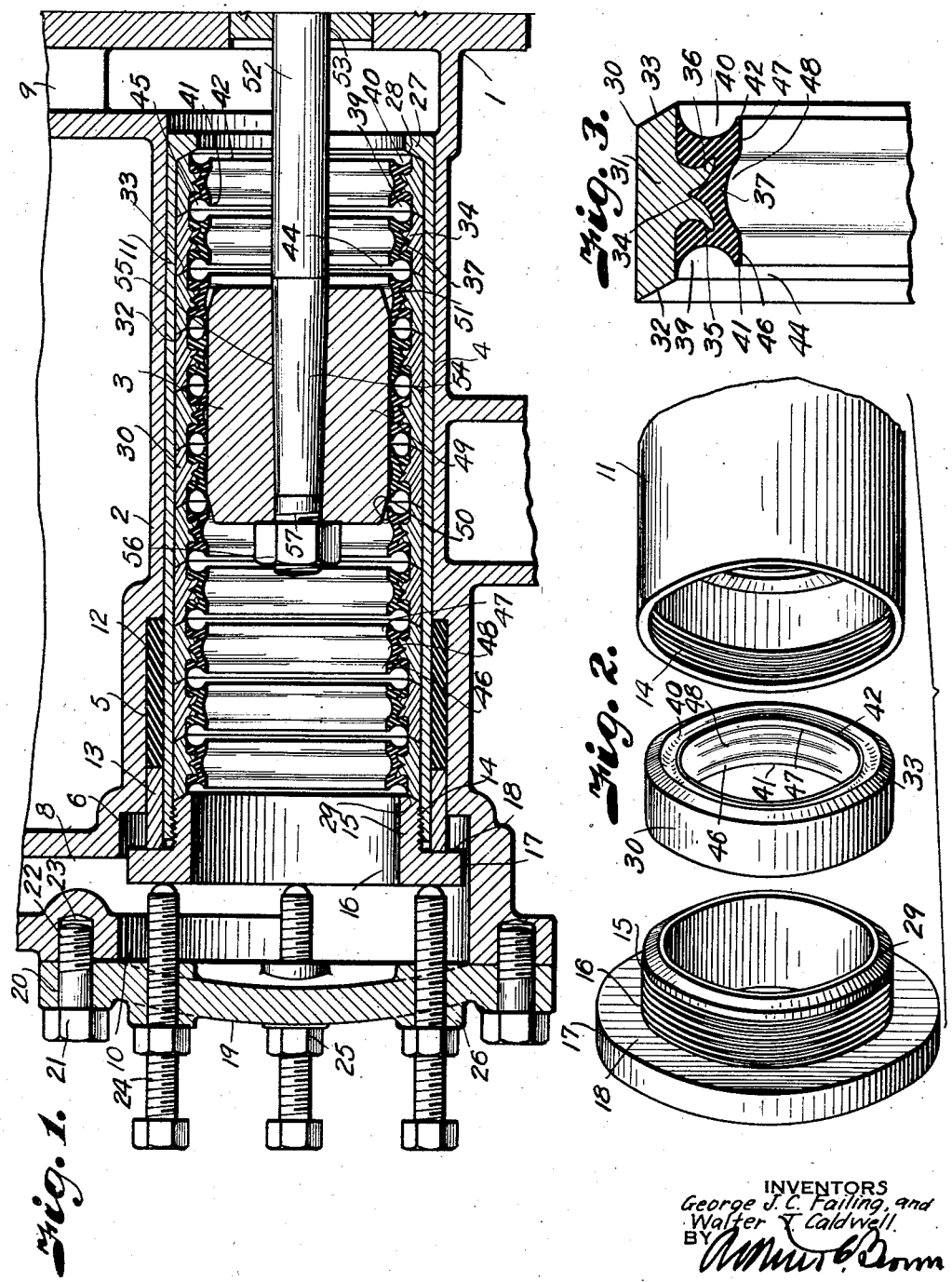

2,259,432

UNITED STATES PATENT OFFICE 2,259,432

CYLINDER AND PISTON STRUCTURE FOR PRESSURE DEVICES

George J. C. Failing and Walter T. Caldwell, Enid, Okla., assignors to The George E. Failing Supply Company, Enid, Okla., a corporation of Oklahoma Application May 25, 1938, Serial No. 209,956

8 Claims. (Cl. 309—3)

This invention relates to fluid pressure devices such as pumps, hydraulic jacks, compressors, and the like, and particularly to a cylinder and piston structure therefor.

The principal object of the invention is to provide a cylinder and piston structure designed for effectively handling fluids under high operating pressures with a minimum of leakage.

Other important objects of the invention are to provide a cylinder and piston structure that is effective in sealing liquids containing abrasive materials; to provide a cylinder with flexible sealing means for contacting the piston; to provide a piston structure that may be hardened and ground; to provide a removable cylinder liner equipped with flexible inner facing means; to provide a flexible facing that is adapted for ready installation in a cylinder or liner; and to provide a sealing structure arranged for relieving abrasive particles that ordinarily tend to pass between the piston and walls of the cylinder.

In accomplishing these and other objects of the invention, as hereinafter pointed out, we have provided improved details of structure, the preferred form of which is illustrated in the accompanying drawings, wherein:

Fig. 1 is a longitudinal section through a pump cylinder equipped with a liner having sealing means embodying the features of the present invention.

Fig. 2 is a detail perspective view of the gland end of the cylinder liner, one of the liner facing rings, and the retaining gland shown in disassembled spaced relation.

Fig. 3 is an enlarged section through one of the liner facing rings.

Fig. 4 is a section through a pump cylinder equipped with a modified form of the invention.

Fig. 5 is a similar section illustrating a further modified form.

Referring more in detail to the drawings:

1 designates a pump having a cylinder portion 2 and a piston 3 operable therein for delivering fluid under pressure, for example, a drilling fluid such as used in rotary well drilling operations. The cylinder 2 has a longitudinal bore 4 that is provided at the head end thereof with stepped counterbores 5 and 6.

Formed at the respective ends of the cylinder are the usual fluid passageways 8 and 9 leading to and from the respective valves (not shown). The head of the cylinder is provided with an opening 10 aligning with the bore of the cylinder and which is of substantially the diameter of the outer counterbore 6. The opening 10 is for the insertion of a cylinder liner 11 that is wedged within the bore 4 at the rear end thereof and which is sealed about the periphery at the head end of the cylinder by a packing ring 12 seated within the counterbore 5.

The liner is of sufficient length to project within the counterbore 6 and slidably supports a follower ring 13 adapted to compress the packing 12 into sealing engagement with the liner and cylinder to prevent leakage therebetween. The head of the liner is internally threaded, as at 14, for anchoring the externally threaded neck 15 of a retaining gland 16. The gland 16 has an annular flange 17 of slightly smaller diameter than the bore 6 to form a shoulder 18 on one side thereof for engaging the follower ring or packing compressing sleeve 13.

The opening 10 is closed by a cylinder head 19 overlapping the end of the cylinder and having a circular series of openings 20 therein for passing fastening devices 21 having threaded shanks 22 engaged in aligning threaded sockets 23 of the cylinder, as shown in Fig. 1. Threadedly supported within the cylinder head are set screws 24 arranged in circular series in substantial alignment with the outer face of the flange 17, and which are adapted to engage thereagainst in urging the cylinder liner into the inner end of the cylinder bore 4. The set screws are retained in adjusted position by jam-nuts 25 that engage against bosses 26 on the outer face of the cylinder head.

The structure thus far described is conventional to a standard type pump, and specifically forms no part of the present invention. The inner end of the liner, however, is provided with an inwardly extending annular lip 27 forming a bevelled face 28 that cooperates with a similarly arranged bevelled face 29 on the neck of the gland 16 to retain a plurality of rings 30 which form an important part of the present invention. The rings 30 are best illustrated in Fig. 3, and include ring-like bodies 31 (Fig. 3) having outer diameters of sufficient size to be snugly slidable within the threaded end of the liner. The sides of the ring are formed on bevels 32 and 33 so that when the rings are placed in juxtaposition within the liner the bevelled faces 32 on one ring sealingly engage the corresponding bevelled face 33 on the adjacent ring to prevent leakage between the respective rings. The faces 32 and 33 of the endmost rings respectively engage the bevelled faces 29 and 28 of the packing gland and the lip 27 so that when the packing gland is tightened into position the rings are urged into rigid contact with each other, thereby in effect forming a continuous sleeve extending the length of the liner.

Formed on the inner face of each ring is an internally extending rib 34 having outwardly converging, hook-like flanges 35 and 36 for anchoring facings 37 that are formed of resilient material, such as rubber, vulcanized to the inner peripheries of the rings about the retaining flanges 35 and 36. The inner circumference of the facings is slightly smaller than the periphery of the piston 3, later described. The side faces of the sealing material have annular grooves 39 and 40 intersecting the inner circumferences of the sealing material to form flexible lips 41 and 42 increasing in thickness from the terminal edges thereof toward the bodies of the facings. The terminal edges of the lips are arranged so that when the rings are placed in juxtaposition within the liner they are spaced apart to provide annular throats 44 leading to annular chambers 45 formed by the grooves 39 and 40 which provide for release of granular particles that may tend to pass between the piston and the sealing lips of the rings.

The piston contacting surfaces 46 and 47 of the facings are substantially cylindrical to provide sufficient bearing on the periphery of the piston, and the portion intermediate the surfaces 46 and 47 is relieved, as at 48, to enhance flexibility of the sealing lips and limit resistance to movement of the piston.

The piston 3 includes a cylindrical body 49, having tapered ends 50 and 51 of smaller diameter than the normal diameter of the flexible lips 41 and 42 so that the piston is readily reciprocable in the cylinder to pass the lips responsive to actuation of a piston rod 52. The piston rod 52 may be slidable in suitable bearings 53, and has a tapered end 54 engaging in a tapered opening 55 extending through the axis of the piston. The piston is retained on the tapered end of the rod by a nut 56 mounted on a reduced threaded end 57 of the rod which projects from the forward end of the piston. When the nut is tightened the piston is urged into sealing contact with the taper of the rod to prevent leakage therebetween. Since the piston has a smooth, cylindrical periphery bevelled at its ends, it may be hardened and ground to a true cylindrical surface so as to resist wear and abrasion by any of the gritty particles tending to pass between the piston and sealing elements.

In assembling the apparatus constructed as described, a sufficient number of rings 30 are slipped into the threaded end of the liner so that when the innermost ring contacts the bevelled face 28 of the lip 27 the bevelled face of the outermost ring is in position to be engaged by the packing gland 16 when it is screwed therein. The liner is then inserted into the cylinder through the opening 10, after which the packing ring 12 is inserted into the bore 5, followed by the ring 13. The retaining gland 16 is then threaded into the open end of the liner to urge all of the sealing rings into contact with each other and anchor them firmly therein so as to resist longitudinal movement thereof responsive to reciprocation of the piston. Application of the retaining gland also causes the ring 13 to compress the packing into sealing engagement with the liner. The rod 52 carrying the piston is then inserted in the cylinder, after which the head 19 is applied to close the opening 10. The set screws 24 are then moved into contact with the retaining gland to prevent displacement of the liner. After adjustment of the set screws, the jam-nuts 25 are tightened thereon to prevent loosening thereof. Upon actuation of the piston rod 52, the piston is reciprocated from one end of the cylinder to the other. During movement of the piston the reduced tapered ends thereof freely pass the lips of the sealing elements, but as the sealing lips ride over the tapers they tighten about the cylindrical face of the piston, as shown in Fig. 1, to prevent leakage of fluid therebetween. The pressure of the fluid acting on the lips also enhances sealing engagement of the lips with the piston to further assure against leakage from one end of the cylinder to the other. Should any gritty material be contained in the fluid, it will readily pass through the annular throats 44 into the cylindrical chambers 45. As the piston passes the respective annular openings the granular material will drop from the chambers and will be flushed from the cylinder by movement of the fluid.

The form of the invention shown in Fig. 4 is substantially the same as that illustrated in the preferred form with the exception that the resilient facing is formed as a part of the liner. In this form of the invention the cylinder liner 58 has a series of spaced, inwardly extending annular ribs 59 corresponding to the ribs 34, previously described, and the sealing material 60 is molded thereto to form a continuous resilient facing having a series of oppositely directed sealing lips 62 and 63 spaced apart in the same manner as the sealing lips of the sealing rings described in the first form of the invention.

In the form of the invention illustrated in Fig. 5, the cylinder liner corresponds in construction to the cylinder liner in the first form of the invention and is equipped with a series of rings 64 that are sleeved therein and which have inwardly extending annular ribs 65 for anchoring resilient sealing material 66 shaped to provide flexible lips 67 adapted to contact the periphery of the piston 68. Since this form of the invention has sealing lips extending only in one direction the rings are arranged in sets at the opposite ends of the liner, whereby the sealing lips in one set are directed toward the sealing lips of the other set. The sets of rings are spaced apart at the center of the liner by a spacing ring 69. In this form of the invention the piston is of sufficient length so that it does not pass the center of the cylinder when it reaches the limits of its stroke.

From the foregoing it is obvious that we have provided a piston and cylinder structure wherein the piston may be hardened and ground to form a wear resisting surface in contact with resilient facings having sealing lips so that when pressure is applied incidental to operation of the piston, as in the case of a pump, the sealing lips act to effect seal with the piston progressively with its movement along the cylinder, or in the case of a hydraulic jack or the like, seal is effected by liquid pressure acting on the lips to similarly prevent leakage about the piston. The structure as described is substantially resistant to scoring by granular material carried in the liquid, and is, therefore, especially adapted for pumps and the like handling drilling fluids as used in rotary drilling operations. The rings are also readily replaceable and firmly anchored in position in a facile manner.

What we claim and desire to secure by Letters Patent is:

1. In an apparatus of the character described, a liner having an internal lip at one end, a series of rings inserted in said liner, a packing gland having connection with the opposite end of the liner to cooperate with said lip in urging the rings into sealing contact with each other, a spacer inserted between selected rings at approximately the center of the liner to divide the rings into sets, and flexible facings on said rings having flexible lip portions arranged with the lip portions on one set directed toward the lip portions of the other set.

2. In an apparatus of the character described, a cylinder having fluid pasages at the ends thereof, a piston reciprocable in the cylinder for moving fluid under pressure through said passages, a resilient facing in the cylinder having a plurality of lips extending away from the passages and in the direction of the piston when it is moving toward said passages for sealingly contacting the piston, said lips being closely arranged and having underlying grooves cooperating with adjacent lips to form annular recesses in connection with the interior of the cylinder to release granular materials tending to pass between the lips and the piston, and anchoring means encircling the resilient facing and connected therewith to prevent collapse of the facing on the suction stroke of the piston.

3. In an apparatus of the character described, a cylinder, a piston reciprocable in the cylinder, and a resilient facing in the cylinder having a plurality of spaced lips arranged to be successively engaged by the piston responsive to movement of the piston from one end of the cylinder to the other, said facing having grooves encircling said lips to form recesses surrounding said lips.

4. A lining for pump cylinders including a plurality of juxtaposed rings having inwardly extending projections, and a resilient facing material retained by said projections in contact with the inner face of said rings and provided with grooves in opposite side faces to form flexible lips of less spacing than the width of said rings to provide slots between adjacent lips when the rings are in juxtaposed position with the slots in communication with recesses formed by said grooves.

5. A lining for pump cylinders including a plurality of juxtaposed rings having inwardly extending projections, and a resilient facing material retained by said projections in contact with the inner face of said rings and provided with grooves in opposite side faces to form flexible lips of less spacing than the width of said rings to provide slots between adjacent lips when the rings are in juxtaposed position with the slots in communication with recesses formed by said grooves, said facings having the portions thereof intermediate the lips relieved to enhance flexibility of said lips.

6. In an apparatus of the character described, a piston reciprocable in a cylinder, a resilient facing in the cylinder having a plurality of alternate oppositely directed lips sealingly contacting with the piston, said facing having grooves underlying said lips to form annular recesses circumferentially of the piston, and anchoring means backing the resilient facing and connected therewith to prevent collapse thereof upon the suction stroke of the piston.

7. In an apparatus of the character described, a cylindrical member, a series of rings sleeved in the cylindrical member, means cooperating with the cylindrical member for retaining said rings in spaced contact with each other, resilient facings on said rings having flexible piston engaging lips, a piston reciprocable in the cylindrical member in contact with the facings, and anchoring means on the rings imbedded in the resilient facings for preventing collapse of said facings on the suction stroke of the piston.

8. In an apparatus of the character described, a cylinder, a piston reciprocable in the cylinder, a plurality of juxtaposed flexible lips sealingly contacting the piston and spaced apart to form throats communicating with relief chambers between said lips, and rigid anchoring means for said lips for preventing collapse of the lips on the suction stroke of the piston.

GEORGE J. C. FAILING.
WALTER T. CALDWELL.